United States Patent Office 2,959,489
Patented Nov. 8, 1960

2,959,489

HIGH TEMPERATURE PORTLAND CEMENT MORTARS

Herman B. Wagner, Perkasie, Pa., assignor to Tile Council of America, Incorporated, a corporation of New York No Drawing. Filed Nov. 12, 1957, Ser. No. 695,552

12 Claims. (Cl. 106—93)

This invention relates to improved hydraulic cement mortar compositions and, more particularly, to improved mortars especially suitable for grouting and setting tile, laying masonry, stuccoing and plastering, where the installation is done under warm climatic conditions.

Conventional mortars for setting tile and laying up masonry consist of portland cement, lime and sand. Water is added to this mixture to obtain workability and to take part in the hardening or curing by means of which the cement forms a gel. Such mortars are not entirely self-curing in that they tend to lose considerable water by evaporation into the surrounding air and also by absorption into the tile or masonry which is being set. If the water loss is too great, the curing action is incomplete and the surface becomes soft and chalky.

Conventional mortars, although possessing certain advantages, such as high bond strengths (if properly installed) non-flammability, permanence, good water resistance, and immunity to rodent, insect and fungi attack, also have certain other disadvantages, such as requiring thick, and generally multiple, layers to be placed before setting tile thereon. This entails the use of large quantities of material and requires considerable labor in mixing, placement, and trowelling. There is the disadvantage, also, that very wet conditions must be maintained for proper hardening and bonding of conventional Portland cement compositions. Furthermore, because of the necessity for maintaining such very wet conditions, and also because of the bulk of the materials associated with a conventional Portland cement-ceramic tile installation, it has often been impossible or impractical to use such mortars over such substrates as gypsum wallboard or plaster.

At ordinary room temperatures, partially methoxylated cellulose (about 20–30% methoxyl content, for example) goes into aqueous solution readily and, characteristically of all solutions of high polymers in liquids, the viscosity of the solution is markedly raised. But when the temperature of this solution is raised somewhat, the water molecules increase their rate of motion and, in effect, tend to disassociate themselves from the polymer molecules. This results in a reduction of the effective size of the hydrated polymer molecules and leads to a solution of lower viscosity.

When the temperature of the solution is further raised, the increased activity of the water molecules leaves only what may be termed a "thin sheathing" of water molecules around the polymer molecules and the forces now redeveloping among the polymer molecules produce a water-containing gel. The water not associated with the gel micelles forms a separate low viscosity phase distinct from the gel phase. This low viscosity water phase is absorbed into any porous substance, such as tile, cinder block, gypsum board, etc., brought into contact with the mortar of which the methyl cellulose is a part and the consequent water loss leads to improper curing of the mortar.

In my application Serial No. 686,848, filed September 30, 1957, now Patent 2,934,932, I have described and claimed improved mortar compositions which include certain percentages of methyl cellulose. These improved mortars do not have the disadvantages associated with conventional mortars, which have been described above. They have the ability, for example, to cure properly even when used under dry surrounding conditions and over porous substrates. The improvement is primarily a consequence of the increased viscosity that methyl cellulose, in relatively small amounts, imparts to the aqueous phase of such compositions. However, the improved methyl cellulose-containing mortars which have been described in my previous application, still have the disadvantage that they do not satisfactorily "dry-cure" at temperatures substantially higher than ordinary room temperatures (70–75° F.). When such compositions are used at elevated temperatures for installing tile, inadequate bonding of tile to mortar and of mortar to substrate usually results. In some instances, the placement of tile on a vertical surface has been found to be impossible or impractical.

I have now discovered further improved compositions which have all of the advantages imparted by the methyl cellulose, but have the further advantage of providing strong bonding at elevated temperatures, as well as at ordinary temperatures.

My new discovery is based on my finding that the improper curing and poor workability at elevated temperatures of the previous methyl cellulose-containing mortars is due to a decreased rate of solution of the methyl cellulose at such temperatures and is also due to the diminished effectiveness of that methyl cellulose which is dissolved, in increasing the viscosity and water retentivity of the aqueous phase.

In my new mortar compositions, the above-described adverse effects of elevated temperatures are overcome by the use of additive substances which have the effect of raising the temperature range at which the methyl cellulose solution will gel. These additive substances comprise urea and inorganic thiocyanates. The improved compositions may also include other additives, such as glycerine, to reduce the rate of hydration of the Portland cement and thus to maintain the fluidity needed in the mortar or grout mass for proper workability, and they may also contain other more conventional ingredients such as sand and powdered limestone, or pigments.

The following are examples of compositions within the scope of the present invention.

*Example 1*

The following mixture:

98.30% Portland cement
1.35% methyl cellulose (4000 centipoises in 2% aqueous solution)
0.35% urea was mixed with 35% of its weight of water and allowed to slake for fifteen minutes. The material was then remixed and trowelled over a gypsum wall board backing to provide a layer having an average thickness of 1/16". All materials, including the wall board, were at a temperature of about 110° F. Dry, non-vitreous ceramic tile were set on this dry "thin-setting" bed. Tile could be set in this bed during a period of up to about 30 minutes after the bed was prepared. Tile that had been placed during this period could be realigned during a period of about 15 to 20 minutes after placement. When a somewhat greater thickness of mortar layer (about 3/32 to 1/8" average thickness) was used with this composition, both the above times were considerably extended. For purposes of comparison, a control composition containing 99.5% Portland cement and 0.45% methyl cellulose of the same viscosity grade, while giving satisfactory results at 70–75° F. did not perform satisfactorily at temperatures above about 80° F.

Example 2

The composition:

97.95% Portland cement
1.70% methyl cellulose (400 centipoise grade)
0.35% urea mixed with 34% of its weight of water, provided a mortar which was usable in the same manner as described in the previous example, at up to 105–110° F.

In the mortar compositions of the present invention, the methyl cellulose may range in viscosity from about 400 centipoises to about 4000 centipoises (measured in 2% aqueous solution) and in amount from about 1.1% to about 3.8%. If the highest viscosity grade within this range is used, the maximum amount used should be about 2.5%. If the minimum viscosity grade is used, the minimum amount should be about 1.3%.

The urea may be used in an amount of from about 0.2% to about 1.5% by weight with the preferred range being 0.35 to 1.0%. Amounts somewhat over 1.5% do no harm, but no further benefit apparently is obtained above 1.5%. As the percentage of urea is increased up to the maximum stated, the temperature at which the methyl cellulose will gel properly is increased, the upper temperature limit of use being about 125° F.

Other additive substances, having the same effect as urea, in the compositions of the present invention are inorganic thiocyanates. Suitable inorganic thiocyanates are those of the alkali metals, for example, sodium, potassium, lithium or cesium, and of the alkaline earth metals, for example, barium, calcium, strontium or magnesium. Some examples of improved mortar compositions utilizing this type of additive are as follows:

Example 3

The composition:

98.35% Portland cement
1.35% methyl cellulose (4000 centipoise grade)
0.30% sodium thiocyanate mixed with 35% of its weight of water provided a mortar having about the same properties as that of Example 1. It could be used effectively at temperatures as high at 110° to 115° F.

Example 4

The composition:

98.00% Portland cement
1.70% methyl cellulose (400 centipoise grade)
0.30% potassium thiocyanate was mixed with 35% of its weight of water and provided a mortar that could be used effectively at temperatures up to 105–110° F.

The range of effective use of the thiocyanates in these mortar compositions is about 0.2% to about 1.2% by weight.

Although most dissolved materials, such as calcium chloride, sodium sulfate, sodium chloride, etc., further lower the temperature at which methyl cellulose can gel properly, urea and the inorganic thiocyanates raise the gelation temperature. Unlike strongly hydrated materials or ions, such as calcium or zinc ions, for example, which bind water very strongly to themselves, I have found that the thiocyanate ion and urea increase the availability of water to the methyl cellulose. This is probably due to a weakening of the water structure itself when such materials are present as solutes.

Other additives can be used in the mortar compositions of the present invention to impart certain other properties which are desirable in Portland cement mortars. For example, in order to provide a mortar having an extended working time, small amounts of glycerine may be included in the compositions. The following are examples of compositions including glycerine.

Example 5

The composition:

98.15% Portland cement
1.35% methyl cellulose (4000 centipoise grade)
0.35% urea
0.05% glycerine absorbed on 0.10% fine perlite carrier mixed with about 33% of its weight of water provided a material that could be used as a thin-setting bed for ceramic tile, and that had an extended working time at temperatures of the order of 105–110° F. Glycerine retards the rate of hydration of the Portland cement thus extending the period during which fluidity and workability of the mix is maintained.

Glycerine can be similarly included in the improved mortars of the present invention which include an inorganic thiocyanate.

Example 6

The composition:

98.15% Portland cement
1.35% methyl cellulose (4000 centipoise grade)
0.30% calcium thiocyanate
0.05% glycerine on 0.10% fine perlite carrier mixed with about 33% of its weight of water provided an improved mortar having high temperature properties similar to the mortar of Example 5.

Amounts of glycerine up to about 0.2% may be used in the mortar compositions of the present invention.

Another type of additive which may be included in the present compositions is a pigment. This type of composition is particularly suitable for pointing ceramic tile.

Example 7

The composition:

93.8% Portland cement
1.85% methyl cellulose (400 centipoise grade)
4.00% titanium dioxide
0.35% urea mixed with 35% of its weight of water, provided a pointing compound that could be used to join the edges of ceramic tile at temperatures in excess of 100° F. If an inorganic thiocyanate is substituted for the urea in the above example, the amount used is about 0.30%.

In accordance with another form of this invention, there is added an alkaline earth metal polysulfide or such a sulfide in combination with a Bunte salt. By Bunte salt is meant an alkyl or aryl ester of an alkali—metal thiosulfuric acid. The lower aliphatic hydrocarbon esters, such as ethyl-, propyl-, and butyl-, or ethylene-, butylene-, or propylene-, are preferred. If aryl esters are used, the simpler members of the series, such as the phenyl ester, are preferred. Any of the alkali metals, sodium, potassium, lithium, cesium, or rubidium may be utilized in these salts. Where the polysulfide alone is used, the amount is about 0.4% to about 4.5% with respect to the weight of Portland cement.

The presence of the polysulfide has been found to retard the rate at which water is absorbed from the mortar into the pores of masonry set in or pointed with the mortar and, through reaction with the Bunte salt, to provide a film at the air-joint surface.

For additional details and description regarding the use of an alkaline earth metal polysulfide or such a sulfide in combination with a Bunte salt in mortar compositions, see my co-pending application entitled "Mortar Compositions," Serial Number 568,992, filed March 2, 1956, and now Patent 2,820,713.

Example 8

97.20% Portland cement
1.35% methyl cellulose (4000 centipoise grade)
0.55% Bunte salt
0.55% calcium polysulfide
0.20% urea
0.15% glycerine on perlite (1:2)

In utilizing improved mortar compositions in accordance with the present invention, it is desirable to be able to make up the proper mixes "on the job," particularly where the mortars are being used for large scale installations. It has been found that an improved blend of Portland cement, sand or powdered limestone, and the special ingredients as taught by the present invention, may be provided by employing pre-blended concentrate to be mixed at the site of use with additional Portland cement or aggregate. This concentrate can be pre-blended with "factory" mixing equipment using Portland cement and/or sand, and/or powdered limestone.

*Example 9*

86.84% Portland cement
6.24% methyl cellulose
2.62% Bunte salt
2.62% calcium polysulfide
.96% urea
.72% glycerine on perlite (1:2)

Other conventional ingredients, such as sand and powdered limestone can be used in the mortar compositions of the present invention. Powdered limestone is preferably used in amounts up to about 45% and sand may be used in any amount up to about 75%.

The amount of water used in making up mortars from the compositions of the present invention varies somewhat with the relative proportions of the solid ingredients used, on the use to which the mortar is to be put, and on whether sand or powdered limestone is included in the mix. In general, the range of water content may be from about 20% to about 40% with the optimum in most cases being about 33% to about 35%.

There have thus been described improved hydraulic cement mortar compositions which are useful for setting tile, laying masonry blocks, or pointing ceramic tile, which compositions have the unusual advantage of being usable at elevated temperatures. They thus provide mortars which can be effectively used in hot climates and even eliminate the necessity for artificial cooling means formerly required in some installations.

Having thus described the invention, what is claimed is:

1. A dry mortar composition consisting essentially of methyl cellulose, a compound selected from the group consisting of urea and an inorganic thiocyanate and a major portion of Portland cement.

2. A dry mortar composition consisting essentially of, by weight, methyl cellulose, a compound selected from the group consisting of urea in an amount of from 0.2 to 1.5% and an inorganic thiocyanate in an amount of from 0.2 to 1.2%, the balance of the composition being Portland cement.

3. A composition as set forth in claim 2, wherein the methyl cellulose is present in an amount from 1.1 to 3.8%, said methyl cellulose having a viscosity grade in the range of from 400 to 4000 centipoises.

4. A composition as set forth in claim 3, in which said urea is present in an amount in the range of from 0.35 to 1.0%.

5. A dry mortar mix consisting essentially of, by weight, 1.35% methyl cellulose having a viscosity grade in the range of from 400 to 4000 centipoises, about 0.35% urea and about 98.3% Portland cement.

6. A dry mortar mix consisting essentially of, by weight, from 1.1 to 3.8% methyl cellulose having a viscosity in the range of from 400 to 4000 centipoises, a compound selected from the group consisting of urea in an amount of from 0.2 to 1.5% and a water soluble inorganic thiocyanate in an amount of from 0.2 to 1.2%, glycerine in an amount of from 0.01 to 0.2%, and the balance being Portland cement.

7. A dry mortar composition consisting essentially of Portland cement, methyl cellulose, a compound selected from the group consisting of alkyl and aryl esters of an alkali metal thiosulfuric acid, an alkaline earth metal polysulfide, and a compound selected from the group consisting of urea and an inorganic thiocyanate.

8. A dry mortar mix consisting essentially of, by weight, about 1.35% methyl cellulose having a viscosity of 4000 centipoises, about 0.55% calcium polysulfide, about 0.55% of a compound selected from the group consisting of alkyl and aryl esters of an alkali metal thiosulfuric acid, about 0.20% urea and about 97.35% Portland cement.

9. A dry mortar mix consisting essentially of, by weight, 86.84% Portland cement, 6.24% methyl cellulose having a viscosity of 4000 centipoises, 2.62% of a compound selected from the group consisting of alkyl and aryl esters of an alkali metal thiosulfuric acid, 2.62% calcium polysulfide, and 0.96% urea.

10. A mortar mix as set forth in claim 9, wherein there is included about 0.72% glycerine on about 1.5% pearlite.

11. A dry Portland cement composition adapted to be mixed with water to form a high-temperature-setting mortar, containing about 1.1% to about 3.8% methyl cellulose having a viscosity of about 400 to about 4000 centipoises, and about 0.2% to about 1.2% sodium thiocyanate.

12. A dry Portland cement composition adapted to be mixed with water to form a mortar, containing about 1.1% to about 3.8% methyl cellulose having a viscosity of about 400 to about 4000 centipoises, and about 0.2% to about 1.2% potassium thiocyanate.

References Cited in the file of this patent

UNITED STATES PATENTS

| | | |
|---|---|---|
| 1,824,854 | White | Sept. 29, 1931 |
| 2,152,670 | Shutt | Apr. 4, 1939 |
| 2,549,507 | Morgan et al. | Apr. 17, 1951 |
| 2,820,713 | Wagner | Jan. 21, 1958 |